(12) United States Patent
Dutta (10) Patent No.: US 6,891,635 B2
(45) Date of Patent: May 10, 2005

(54) SYSTEM AND METHOD FOR ADVERTISEMENTS IN WEB-BASED PRINTING

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 09/726,265

(22) Filed: Nov. 30, 2000

(65) Prior Publication Data

US 2002/0063885 A1 May 30, 2002

(51) Int. Cl.[7] .......................... G06F 15/00; G06F 17/00
(52) U.S. Cl. ...................................... 358/1.15; 705/14
(58) Field of Search .............................. 358/1.15, 1.18, 358/442; 705/14

(56) References Cited

U.S. PATENT DOCUMENTS

| | | | |
|---|---|---|---|
| 6,738,155 B1 * | 5/2004 | Rosenlund et al. | 358/1.15 |
| 2001/0002204 A1 * | 5/2001 | Jebens et al. | 375/240.01 |
| 2001/0025274 A1 * | 9/2001 | Zehr et al. | 705/402 |

* cited by examiner

Primary Examiner—Kimberly Williams
Assistant Examiner—Saeid Ebrahimi Dehkordy
(74) Attorney, Agent, or Firm—Van Leeuwen & Van Leeuwen; Joseph T. Van Leeuwen; Jeffrey S. LaBaw (57) ABSTRACT

A system and method for providing advertisements in web based printing. A remote printing web server receives advertisements from one or more advertisers. The advertisements may include target audience attributes, such as the profession of target audience members. Digital advertising images and the target audience information is stored on the remote printing web server. A print user connects to the remote printing web server using a browser. Information about the user, such as the user's occupation, are gathered in order to match the user with appropriate advertisements. Advertisements are identified and combined with the document that the user wishes to print. The combined document is then printed on a printer connected to the remote printing web server. In addition, the document that the user wishes to print may be analyzed for document content in order to further select appropriate advertisements to include on the user's printouts.

17 Claims, 7 Drawing Sheets

SYSTEM AND METHOD FOR ADVERTISEMENTS IN WEB-BASED PRINTING

BACKGROUND OF THE INVENTION

1. Technical Field

The present invention relates in general to a method and system for providing advertisements in web-based printing. More particularly, the present invention relates to a system and method for providing free or subsidized printing in exchange for advertising space on printed documents.

2. Description of the Related Art

Remote printing of electronic documents is increasing as more computer users use their computing devices away from their homes and offices. Increased portability of computers, such as laptop computers, and other pervasive computing devices, such as personal digital assistants (PDAs), mobile telephones that can access the Internet and other networks wirelessly, and other portable devices means that more users are using computing devices while traveling.

One device that is often difficult for users to bring with them while traveling is a printing device. While some portable printers are on the market, these printers are usually challenged by slower print speeds and poor document handling capabilities. For example, the user may have to feed individual sheets into the portable printer and wait several seconds, or even minutes, before receiving a printout. In addition, these portable printers are typically not as portable as portable computing devices. Portable printers are usually at least 9 to 12 inches long and several inches wide, making it difficult to carry the device.

Users of portable computing devices often identify electronic documents that they would like to print. Venues frequented by travelers, such as hotels, airports, and copy centers, often have business services available for a fee. The user can use the business service facilities including devices such as computers, monitors, printers, facsimile machines, and copiers and are generally charged an hourly fee. Users may be resistant to pay hourly fees for business equipment when all they need to do is simply print a document from their portable electronic device.

Some travel services, such as a hotel or copy service, allow users to print on the services' printer and pay a printing fee, often a certain amount per page. Again, for document drafts and other informal documents, users are often resistant to paying an often high rate for such casual printouts.

Advertisers increasingly use electronic forms of advertisement, such as banners on Internet web pages, to attract customers. Advertisers spend a great deal of money and effort in identifying target groups of Internet users. For example, a web site that deals with medical equipment and is frequented by medical doctors may host additional advertisements for other medical related goods and services. For instance, a provider of medical software may purchase advertising space on the medical equipment web site in an effort to attract new customers. A challenge with Internet based advertisements is that they only appear for a brief time to the user. Often when the user changes screens or visits another web page, they forget the information. If the user did not write the information down or store the advertiser information as a bookmark, they may not be able to remember how to contact the provider of the advertised goods or services.

What is needed, therefore, is a way to merge advertisers' objectives of identifying and targeting groups of users with users' need for printing documents while traveling.

SUMMARY

It has been discovered that advertisements can be placed on printouts requested by users of remote printers. Advertisers sign up to advertise to the general public or to particular groups of users. When a user is traveling and needs to print a document on a remote printer (i.e., a hotel, airport, copy service printer, etc.), he is asked for information about his occupation and other personal attributes of the user. This information is used to select advertising that is appropriate to the user. The user requests to print out electronic documents and the selected advertisements are included in the printout.

The hosting site of the printer (i.e., the hotel, airport, copy service) is paid by the advertisers for including the advertisers' advertisements in printouts. Advertisers prefer to pay on an image basis. Basically, the hosting site receives a certain amount of money for each image that is displayed to a potential customer. Because of the economic incentive, hosting sites may be encouraged to allow users to print documents for free or at a substantially reduced rate if advertisements are included in the printouts. The hosting site could use other criteria, such as allowing documents of a certain page length be printed for free if advertisements are included and charging a fee for large document printouts, in order to increase the throughput of their printers, and consequently achieve a greater profit for providing the service.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
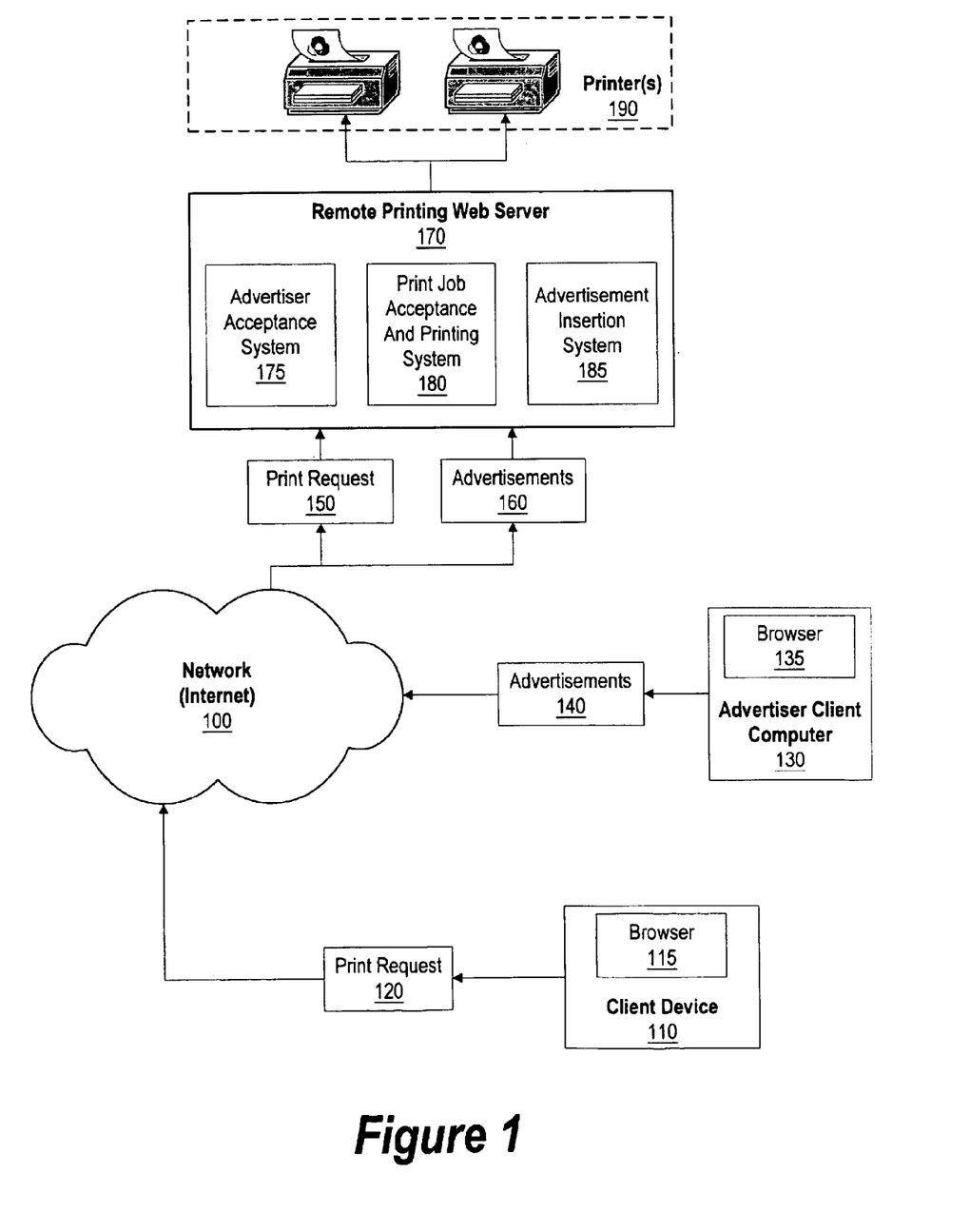
FIG. 1 is a network diagram showing the components used in remote web based printing with advertisements.

FIG. 1 is a network diagram showing the components used in remote web based printing with advertisements. Computer network 100, such as the Internet, is used to connect the various components to one another. Client device 110 such as a portable computer or other pervasive computing device is used as a user print client to connect to computer network 100. A program, such as browser 115 (i.e., Netscape Navigator™, Microsoft Explorer™, etc.) is used to communicate with other devices connected to computer network 100. The user of client device 110 may wish to print a document stored on the client device, such as a word processing document or spreadsheet, or may wish to print a document stored on a third party server connected to computer network 110. When the user of client device 110 wishes to print to remote printer 190, he or she interacts with software located on remote printing web server to send print request 120 through computer network 100 to remote printing web server 170. Remote printing web server 170 receives print request 150, inserts one or more advertisements into the printout and prints the electronic document and the included advertisements onto printer 190.

Advertiser client computer 130 interacts with remote printing web server 170 using computer network 100. The advertiser, using advertiser client computer 130 and browser 135, signs up with remote printing web server 170 to provide advertisements and subsequently provides advertisements to remote printing web server 170 to be included in appropriate electronic documents. The advertiser uses a software program, such as a browser, for communicating with remote printing web server 170 over computer network 100. The advertiser sends advertisements 140 to computer network 100. Computer network 100 passes advertisements 160 along to remote printing web server 170. Remote printing web server includes software components for handling advertisements. Advertiser acceptance system 175 receives advertiser registrations, accepts digital forms of advertisements, and provides payment software for the advertiser to use in paying for the advertising space. Print job acceptance and printing system 180 receives print request 150 from the user, while advertising insertion system 185 inserts advertisements into the user's electronic document before the document is printed by print job acceptance and printing system 180.

Figure 2:
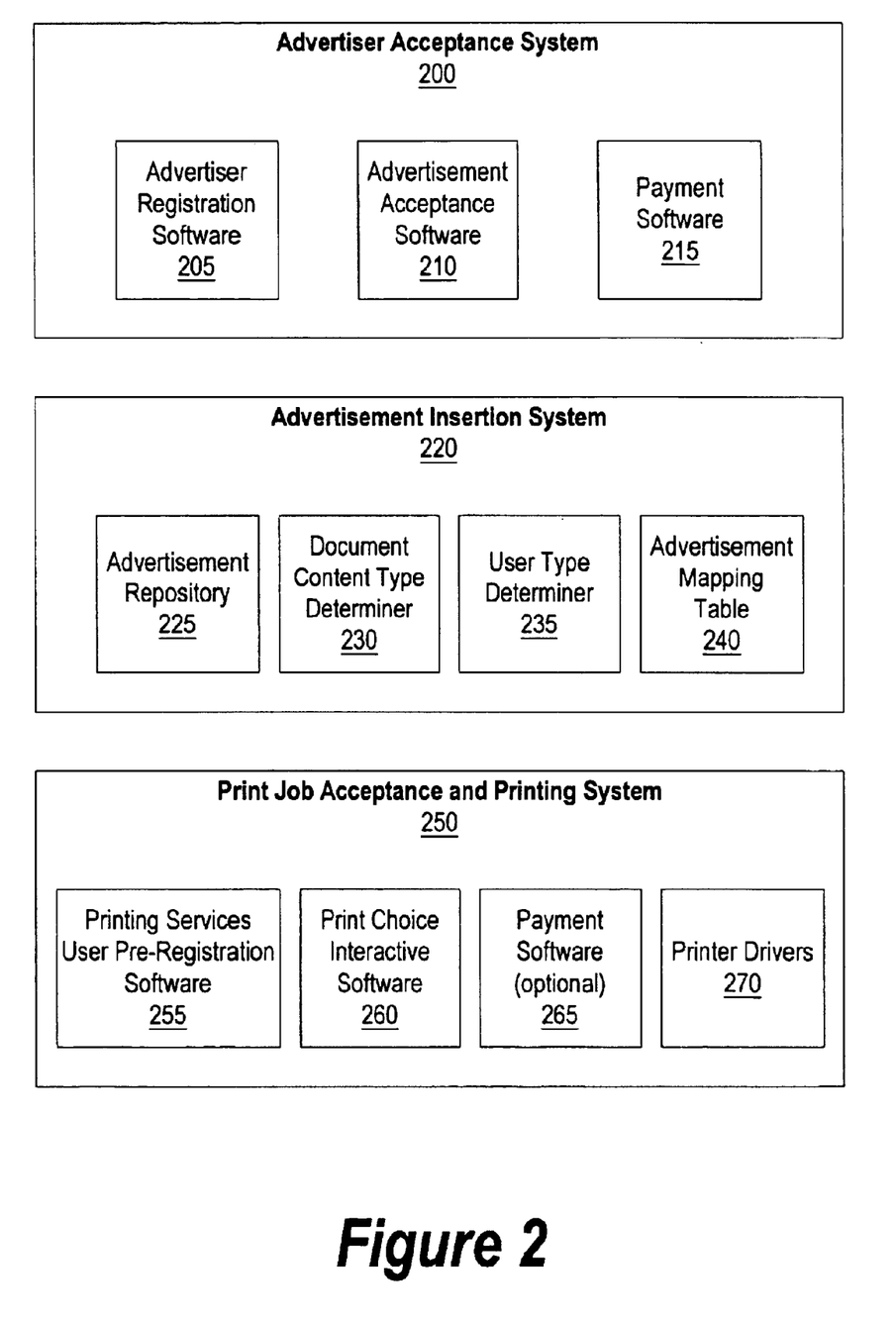
FIG. 2 is a diagram showing the components in the remote printing web server.

FIG. 2 is a diagram showing the components in the remote printing web server. Advertiser acceptance system 200 includes advertiser registration software 205 used to register an advertiser with the remote printing web server. Advertiser acceptance system 200 also includes advertisement acceptance software 210 that puts a digital advertisement on the remote printing web server and stores target audience information (i.e., does the advertisement apply to doctors or engineers?). Payment software 215 is used by the advertiser to pay the owner of remote printing web server for advertising. Payment may be performed using any traditional payment (i.e., payment for number of advertisements placed in certain period of time, flat fee for certain number of placed images, etc.).

Advertisement insertion system 220 includes four component functions. Advertisement repository puts and removes advertisements in a data storage area accessible by the remote printing web server. The repository also includes information about the intended audience for each advertisement stored in the repository. Document content type determiner 230 is software for determining the type of document being printed based on keywords found in the document or other attributes of the document (i.e., website from which the document was downloaded, document titles, etc.). Document content type determiner also includes the type of file being printed, such as a spreadsheet, a word processing document, or a web page. User type determiner software 235 determines the type of user that is printing a document (i.e., a doctor, an engineer, an accountant, etc.). This information can be gathered using interactive software that requests the information from the print user before a document is accepted for printing. Advertisement mapping table 240 is an electronic table including advertisement names (i.e., file names or other advertisement identifier) and the types of documents and users that are the target audience for the advertisement. The advertising mapping table may also keep track of the number of times each advertisement has been included in a printout.

Print job acceptance and printing system 250 includes four software components for printing users' document print requests. Printing services user pre-registration software 255 is used to register a user with the remote printing web server. Print choice interactive software 260 is used to interactively gather information from the user. For example, the user may be asked for personal attribute information, for example whether the user is a doctor, engineer, or accountant. Print choice interactive software may also explain that advertisements will be included with the user's printouts. The user may be able to opt out of the advertisements if he or she prefers to pay a fee for using the remote print services. For example, a user may print several drafts on printouts that include advertisements and then pay for a final draft to be printed without advertisements that is more appropriate to give to a customer or client. Payment software 265 allows the user to pay for printouts, either at a subsidized rate if advertisements are included in the user's printout or at a higher rate if no advertising is selected by the user. Other printing options, such as type or quality of paper and printing of envelopes, may also be included at additional cost to the user. Printer driver software 270 includes printer drivers for one or more printers used by the remote printing web server.

Figure 3:
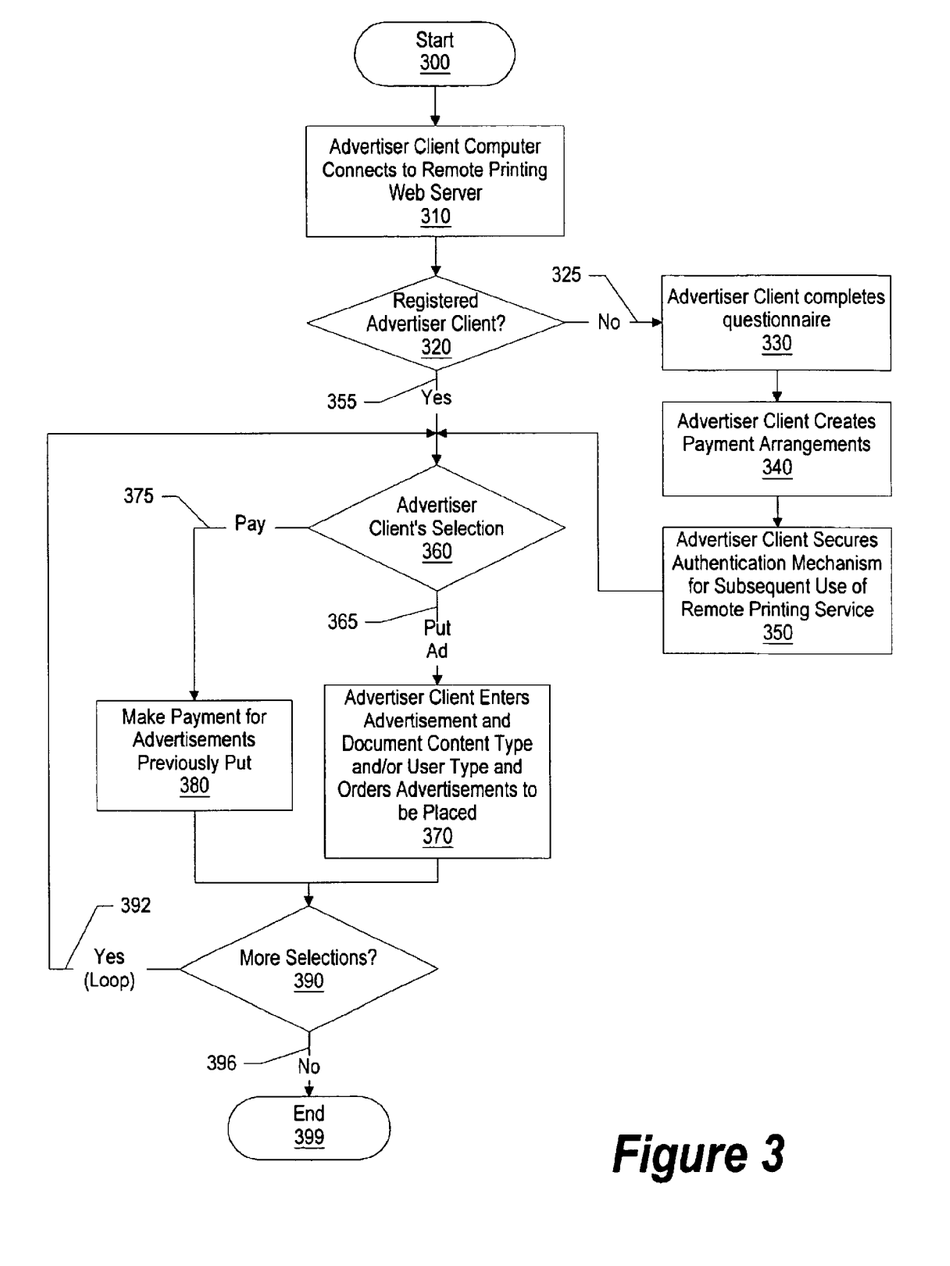
FIG. 3 is a flowchart showing the processing of an advertiser client connecting to a remote printing web server.

FIG. 3 is a flowchart showing the processing of an advertiser client connecting to a remote printing web server. Processing commences at 300 when the advertiser client computer connects to the remote printing web server (step 310). This connection is made by the advertiser client computer accessing a web page on the remote printing web server's web site. A check is made to determine whether the advertiser client is a registered client of the remote printing web server (decision 320). If the advertiser client is not yet a registered client, decision 320 branches to "no" branch 325 whereupon the advertiser client completes a questionnaire concerning the type of advertising that the client is requesting (step 330). The advertiser client creates payment arrangements (step 340) by providing credit information or other account information. When the advertiser's payment arrangements have been established, the advertiser client secures an authentication mechanism for subsequent use of the remote printing services web server (step 350). The authentication mechanism can be a user name and password that the advertiser uses to access the remote printing web server during subsequent connections. After the advertiser is registered (steps 330 through 350) or if the advertiser was already a registered client (whereupon decision 320 branches to "yes" branch 355), processing continues in order to handle the advertiser's request.

The advertiser makes a selection and this selection is evaluated (decision 360). If the advertiser's decision is to place an advertisement onto the remote printing web server, "put ad" branch 365 is taken whereupon the advertiser client enters a digital advertisement, document content type information and/or user type information along with the number of advertisements to be placed on printouts (step 370). On the other hand, if the advertiser client wishes to pay for advertising, "pay" branch 375 is taken whereupon the advertiser is able to make payment for advertisements previously placed in the remote printing web server (step 380). Payment may be made using a secured online means, such as a credit card number using a secured web site, or provided using an online transfer of money from the advertiser's bank account to the remote printing web server owner's bank account. If the advertiser has more selections that he or she would like to make, decision 390 branches to "yes" branch 392 which loops back to process the advertiser's next selection. If there are no more advertiser selections, decision 390 branches to "no" branch 396 whereupon processing ends at end 399.

Figure 4:
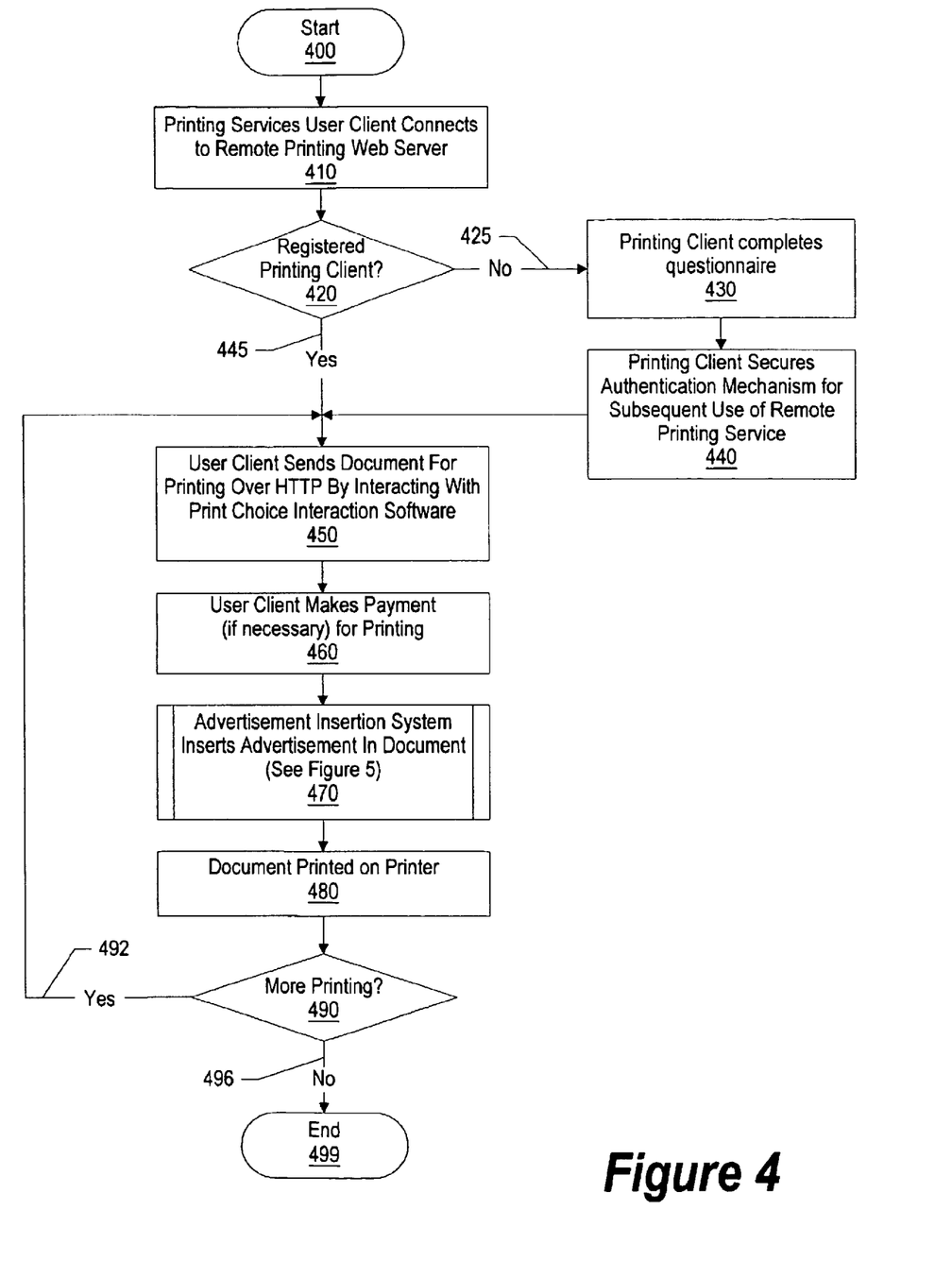
FIG. 4 is a flowchart showing a user print client signing up to use a remote printing web server.

FIG. 4 is a flowchart showing a user print client signing up to use a remote printing web server. Processing commences at 400 whereupon the printing services user client computer connects to the remote printing web server computer (step 410). This connection can be made over the Internet by the client accessing a web page located on the remote printing web server. A decision is made to determine whether the client is a registered printing client (decision 420). If the client has not used the remote printing web server, "no" branch 425 is taken whereupon the user completes a questionnaire (step 430) concerning the user's personal attributes, such as whether the user is a doctor, engineer, accountant, etc., and other user preferences. The print client secures an authentication mechanism for subsequent use of the remote printing web server (step 440). This authentication mechanism may include a user name and password used by the client to access the remote printing web server. After the registrations steps 430 and 440 are completed, or if the client is already a registered user (in which case decision 420 branches to "yes" branch 445), processing continues to handle the user's remote print request.

The client user sends a document for printing over the computer network by interacting with print choice interactive software (step 450). This software may use a protocol, such as HTTP, to send the document over the network to the remote printing web server. If the user has requested no advertisements, or if additional payment is required by the system from the user before printing (i.e., a large document is being printed, the system is set up to receive money from both the advertisers and the users, etc.), the user makes the payment necessary (step 460) before the document is printed. The payment may be received using a credit card owned by the user using a secure connection. One or more advertisements are then inserted in the user's document (predefined process 470, see FIG. 5 for further details), and the document is printed on a physical printer (step 480). A determination is made as to whether the user has more documents he or she wishes to print (decision 490). If the user has more documents, decision 490 branches to "yes" branch 492 which loops back to process the user's next print request. This processing continues until the user has no more documents to print, in which case decision 490 branches to "no" branch 496 and processing terminates at end 499.

Figure 5:
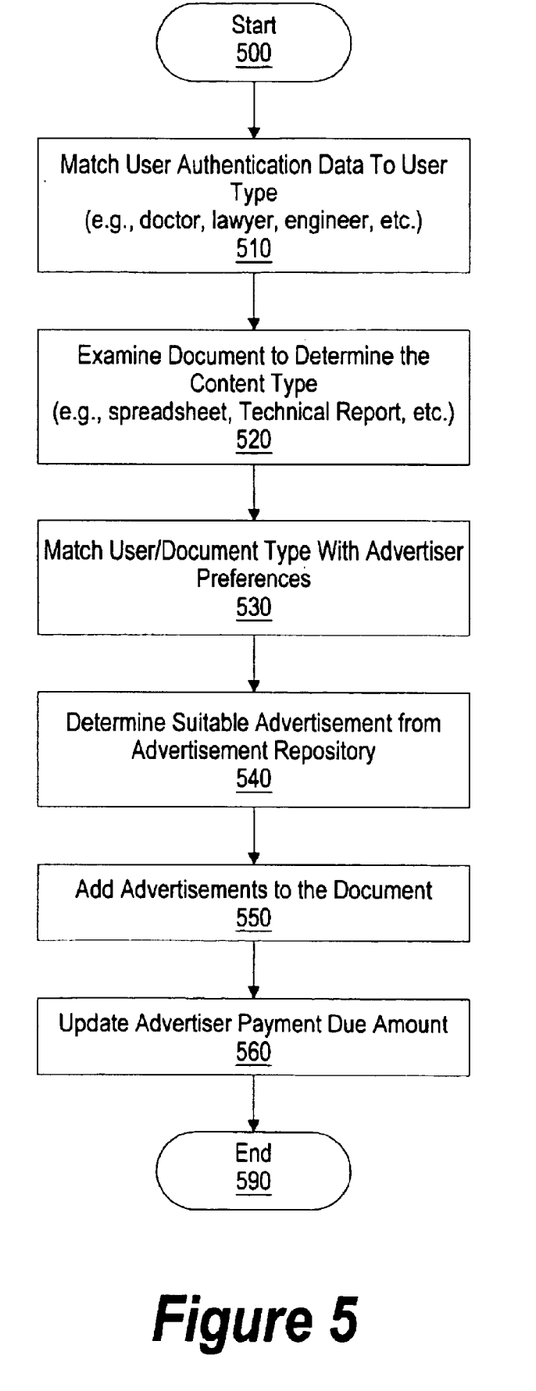
FIG. 5 is a flowchart showing the steps involved in matching user print clients with advertiser clients.

FIG. 5 is a flowchart showing the steps involved in matching user print clients with advertiser clients. Processing commences at 500 whereupon the data entered by the user when registering for the site (i.e., the user's personal attributes) is retrieved (step 510). The document that the user wishes to print may also be analyzed (step 520) to determine the type of content being printed (i.e., a spreadsheet, a word processing document, a web page, etc.). The user and document type are then matched against the available advertiser preferences (step 530). A suitable advertisement is determined from the advertisements stored in the advertisement repository (step 540). The digital image for one or more advertisements is then electronically included in the document print file (step 550). Finally, the advertisement tally is updated to record the fact that the advertisement was included in a printout (step 560) and the advertiser's payment due is adjusted accordingly. Processing then ends at end 590.

Figure 6:
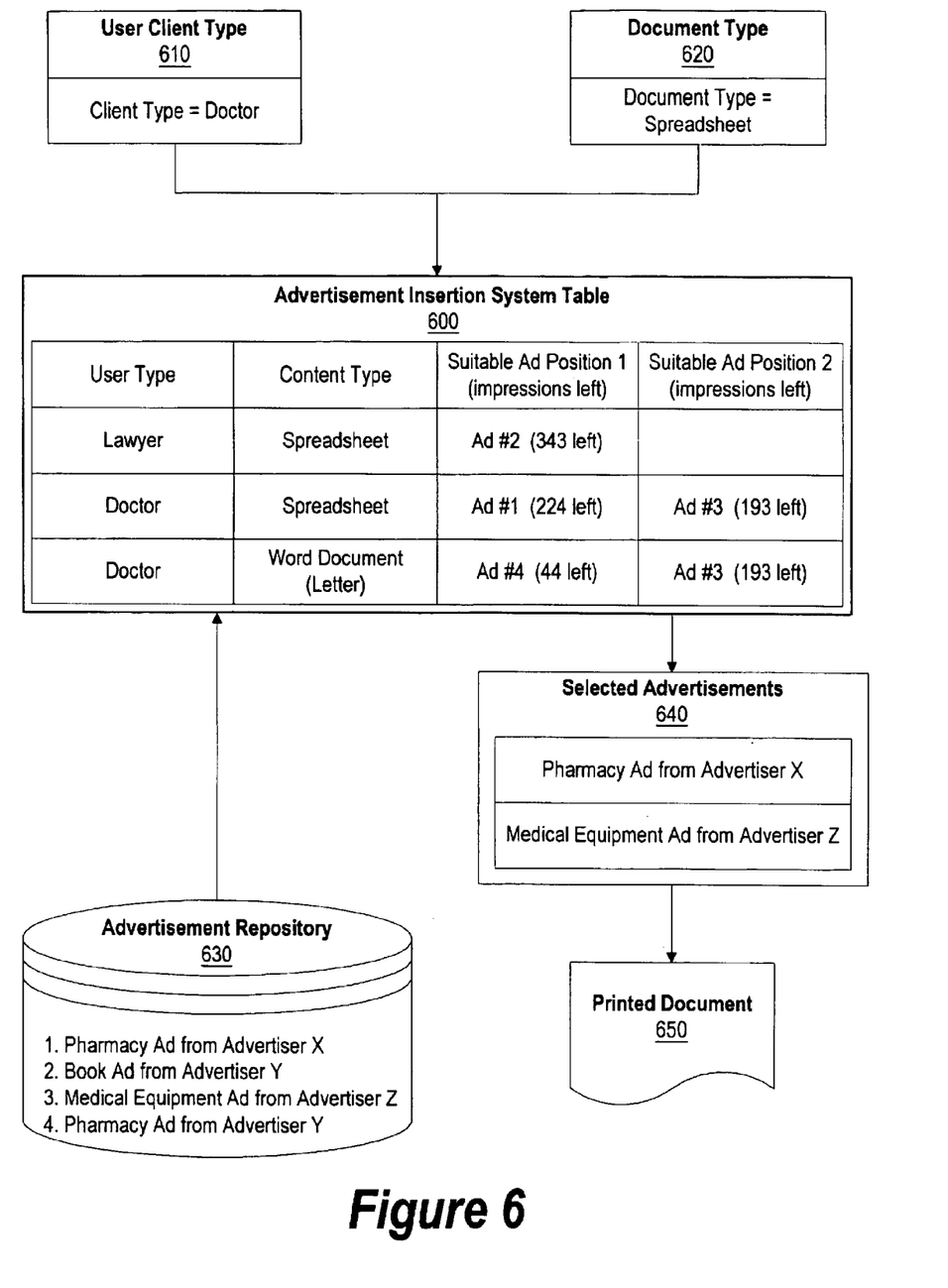
FIG. 6 is a diagram showing the components involved in providing a printed document including advertisements.

FIG. 6 is a diagram showing the components involved in providing a printed document including advertisements. Advertisement insertion system table 600 (see FIG. 2 wherein the table was previously referred to as advertising matching table 240) includes user types, content types, and advertising impressions suitable for the user type/content type. For example, when the user type is a "lawyer" and the document content type is a "spreadsheet" then advertisement #2 is appropriate. When the user type is a "doctor" and the document content type is a "spreadsheet" then advertisements #1 and #3 are appropriate. Finally, when the user type is a "doctor" and the document content type is a "word document" then advertisement #4 and #3 are appropriate. User client type 610 is received from the user's registration information from the user requesting to print. In the example shown, the client type is "doctor." Document type 620 is determined from the document sent for printing, in the example shown the document type is a spreadsheet. Advertisement insertion table 600 is used to determine that, for the example shown, advertisements #1 and #3 should be included with the printout. The advertisement images are retrieved from advertisement repository 630. Selected advertisements 640 are then inserted in the spreadsheet being printed, in this case a pharmacy ad from Advertiser X, and a medical equipment advertisement from Advertiser Z. The modified document (now including the advertising images), is then printed creating printed document 650. Advertisement insertion system table 600 also keeps track of the number of impressions left to be printed. In the example shown, Ad #1 would be decremented from 224 impressions to 223 impressions and Ad #3 would be decremented from 193 impressions to 192 impressions left to be printed.

Figure 7:
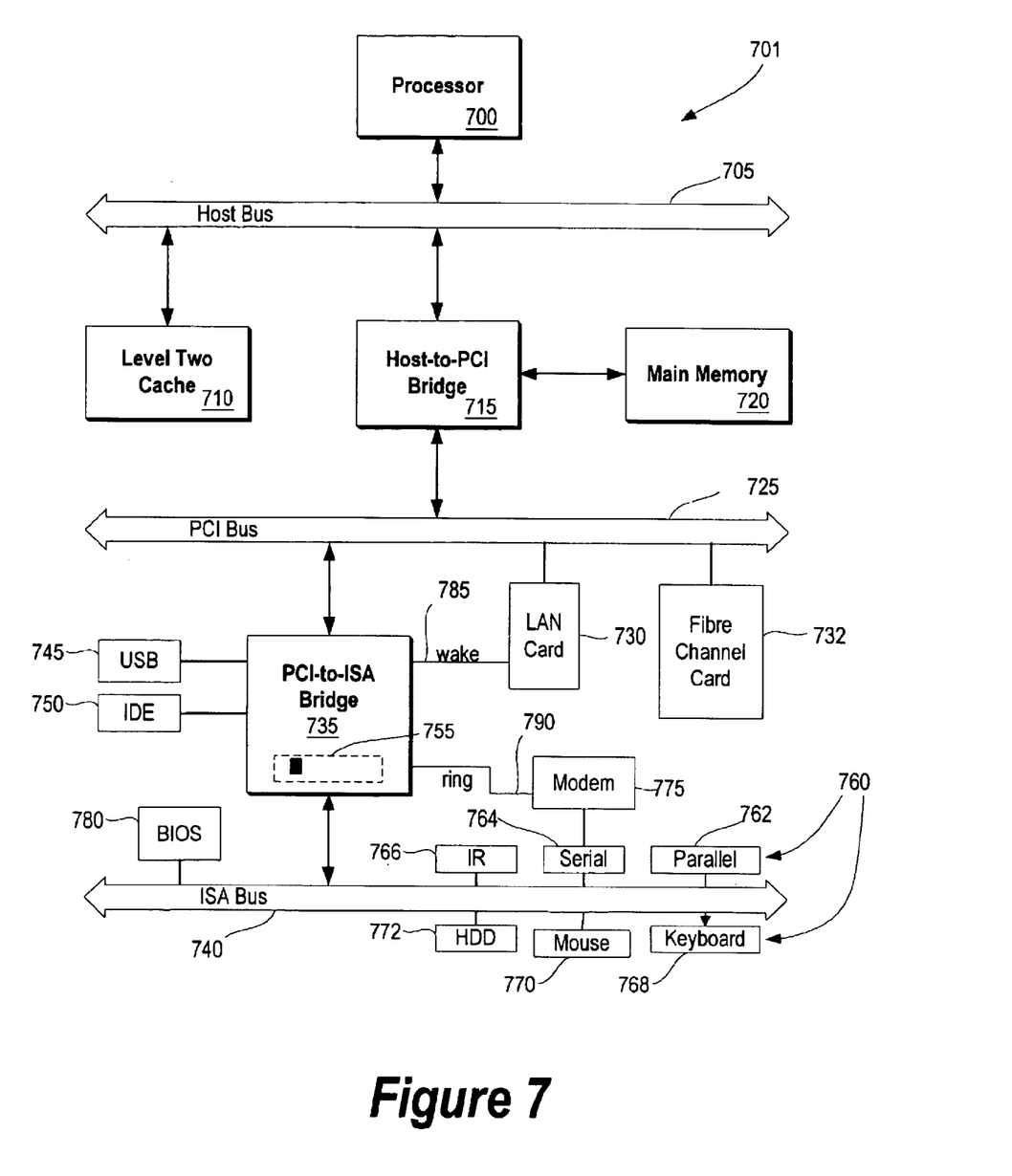
FIG. 7 is a block diagram of an information handling system capable of implementing the present invention.

FIG. 7 illustrates information handling system 701 which is a simplified example of a computer system capable of performing the mobile telephone company operations. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772)

coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of printing documents, said method comprising:

receiving one or more images from one or more image providers;

receiving one or more user attributes from a requestor, the user attributes corresponding to the requestor;

receiving a print request from the requestor, the print request including an electronic document;

combining at least one of the images with the electronic document forming an electronic image document, wherein the combining includes selecting the images based on the user attributes; and printing the electronic imaged document.

2. The method as described in claim 1 further comprising:

receiving one or more target audience criteria for each image from the image provider;

storing the target audience criteria;

matching the target audience criteria with one or more of the user attributes provided by the requestor;

selecting one or more images based on the matching.

3. The method as described in claim 1 further comprising:

registering the image providers, the registering including:

receiving payment information from each image provider; and providing an authentication mechanism to each image provider.

4. The method as described in claim 1 further comprising:

determining a document type of the electronic document;

matching the document type with one or more image document types provided by the image providers; and selecting one or more images based on the matching.

5. The method as described in claim 1 wherein the image providers include an advertiser, the method further comprising:

registering the advertiser, the registering including:

collecting payment information from the advertiser; and providing the advertiser with an authentication mechanism;

collecting image information from the advertiser related to the image, the image information including at least one of document type and user type.

6. The method as described in claim 1 further comprising:

registering the requestor, the registering including:

collecting one or more of the user attributes from the requestor;

providing the requestor with a user authentication mechanism; and determining one or more images based on the user attributes, wherein the images include at least one advertisement.

7. An information handling system comprising:

one or more processors;

a memory accessible by the processors;

a printer accessible by the processors;

a nonvolatile storage device accessible by the processors; and a printing tool, the printing tool including:

means for receiving one or more images from one or more image providers;

means for receiving one or more user attributes from a requestor, the user attributes corresponding to the requestor;

means for receiving a print request from the requestor, the print request including an electronic document;

means for combining at least one of the images with the electronic document forming an electronic image document, wherein the combining includes selecting the images based on the user attributes; and means for printing the electronic imaged document.

8. The information handling system as described in claim 7 further comprising:

means for receiving one or more target audience criteria for each image from the image provider;

means for storing the target audience criteria;

means for matching the target audience criteria with one or more of the user attributes provided by the requestor; and means for selecting one or more images based on the matching.

9. The information handling system as described in claim 7 further comprising:

means for registering the image providers, the means for registering including:

means for receiving payment information from each image provider; and means for providing an authentication mechanism to each image provider.

10. The information handling system as described in claim 7 further comprising:

means for determining a document type of the electronic document;

means for matching the document type with one or more image document types provided by the image providers; and means for selecting one or more images based on the matching.

11. The information handling system as described in claim 7 wherein the image providers include an advertiser, the information handling system further comprising:

means for registering the advertiser, the means for registering including:

means for collecting payment information from the advertiser;

means for providing the advertiser with an authentication mechanism; and means for collecting image information from the advertiser related to the image, the image information including at least one of document type and user type.

12. The information handling system as described in claim 7 further comprising:

means for registering the requestor, the means for registering including:

means for collecting one or more of the user attributes from requestor; and means for providing the requestor with a user authentication mechanism; and means for determining one or more images based on the user attributes, wherein the images include at least one advertisement.

13. A computer program product for printing documents, said computer program product comprising:

means for receiving one or more images from one or more image providers;

receiving one or more user attributes from a requestor, the user attributes corresponding to the requestor;

means for receiving a print request from the requestor, the print request including an electronic document;

means for combining at least one of the images with the electronic document forming an electronic image document, wherein the combining includes selecting the images based on the user attributes; and means for printing the electronic imaged document.

14. The computer program product as described in claim 13 further comprising:

means for receiving one or more target audience criteria for each image from the image provider;

means for storing the target audience criteria;

means for matching the target audience criteria with one or more of the user attributes provided by requestor;

means for selecting one or more images based on the matching.

15. The computer program product as described in claim 13 further comprising:

means for registering the image providers, the means for registering including:

means for receiving payment information from each image provider; and means for providing an authentication mechanism to each image provider.

16. The computer program product as described in claim 13 wherein the image providers include an advertiser, the computer program product further comprising:

means for registering the advertiser, the means for registering including:

means for collecting payment information from the advertiser; and means for providing the advertiser with an authentication mechanism;

means for collecting image information from the advertiser related to the image, the image information including at least one of document type and user type.

17. The computer program product as described in claim 13 further comprising:

means for registering the requestor, the means for registering including:

means for collecting one or more of the user attributes from the requestor;

means for providing the requestor with a user authentication mechanism; and means for determining one or more images based on the user attributes, wherein the images include at least one advertisement.

* * * * *

UNITED STATES PATENT AND TRADEMARK OFFICE
CERTIFICATE OF CORRECTION

PATENT NO. : 6,891,635 B2
DATED : May 10, 2005
INVENTOR(S) : Rabindranath Dutta

It is certified that error appears in the above-identified patent and that said Letters Patent is hereby corrected as shown below:

Column 8,
Line 15, please delete "imaged" and insert -- image --.
Line 21, please delete "requestor;" and insert -- requestor; and --.
Line 39, please delete "advertiser; and" and insert -- advertiser; --.
Lines 40-41, please delete "mechanism;" and insert -- mechanism; and --.

Column 9,
Line 8, please delete "imaged" and insert -- image --.
Line 57, please delete "from requestor; and" and insert -- from the requestor; --.

Column 10,
Line 5, please delete "receiving" and insert -- means for receiving --.
Line 15, please delete "imaged" and insert -- image --.
Line 24, please delete "requestor;" and insert -- requestor; and --.
Lines 42-43, please delete "advertiser; and" and insert -- advertiser; --.
Lines 45, please delete "mechanism;" and insert -- mechanism; and --.

Signed and Sealed this

Twenty-third Day of August, 2005

JON W. DUDAS
*Director of the United States Patent and Trademark Office*